United States Patent [19]

De Marsh

[11] 4,418,379
[45] Nov. 29, 1983

[54] HALIDE AND LIKE LIGHT REFLECTOR AND SOCKET ASSEMBLY FOR GREENHOUSE AND LIKE USE

[76] Inventor: Melvin J. De Marsh, 4306 SW. Juneau St., #11, Seattle, Wash. 98136

[21] Appl. No.: 299,673

[22] Filed: Sep. 8, 1981

[51] Int. Cl.³ .............................................. F21V 7/00
[52] U.S. Cl. .................... 362/282; 362/18; 362/285; 362/296; 362/323; 362/341; 362/401
[58] Field of Search ................ 362/18, 263, 282, 283, 362/285, 322, 341, 346, 352, 360, 401, 407, 278, 280, 296

[56] References Cited

U.S. PATENT DOCUMENTS

| | | | |
|---|---|---|---|
| 2,780,720 | 2/1957 | Bertrams | 362/18 |
| 3,154,253 | 10/1964 | Guth | 362/401 |
| 3,839,632 | 10/1974 | Federico | 362/278 |
| 4,338,655 | 7/1982 | Gulliksen | 362/282 |

FOREIGN PATENT DOCUMENTS 666602 10/1929 France ............................... 362/278

Primary Examiner—Donald P. Walsh
Attorney, Agent, or Firm—John O. Graybeal

[57] ABSTRACT

A frustoconical reflector and socket assembly for halide and like lights especially adapted for promoting growth of plants in a greenhouse environment and the like, the light reflecting surface of the reflector cone being at an angle from about 76° to about 64° and preferably about 68° with respect to the center axis of the cone, and preferably being adjustable as by means of selective interconnection of holes along one radial edge of the cone and selected holes along the other radial edge thereof, and with adjustable counterweight means being provided generally opposite the radially cut edges of the cone to counterbalance the weight of the overlapping segment of the cone for any given selected cone angle.

8 Claims, 9 Drawing Figures

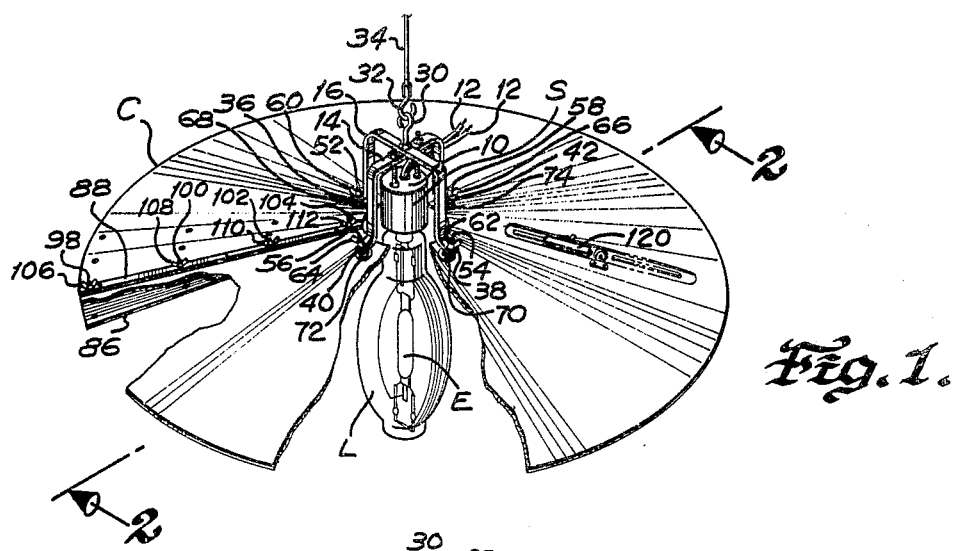
Fig. 1.
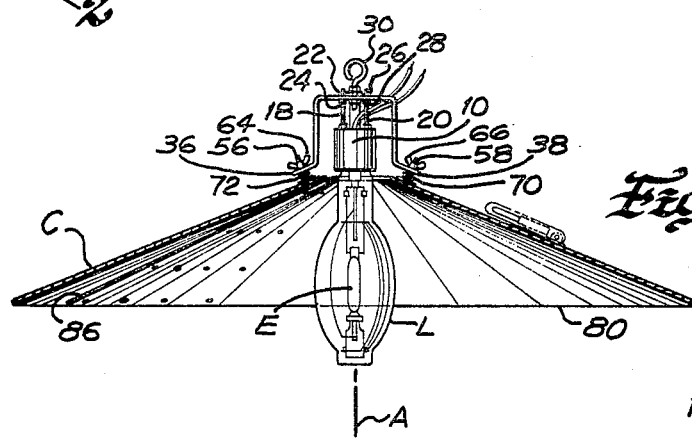
Fig. 2.
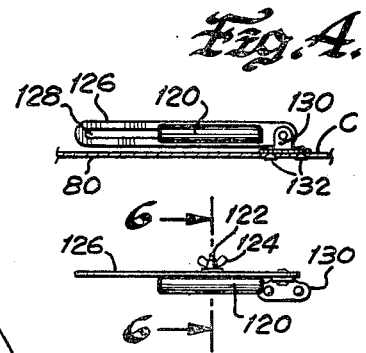
Fig. 4.
Fig. 5.
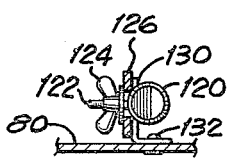
Fig. 6.
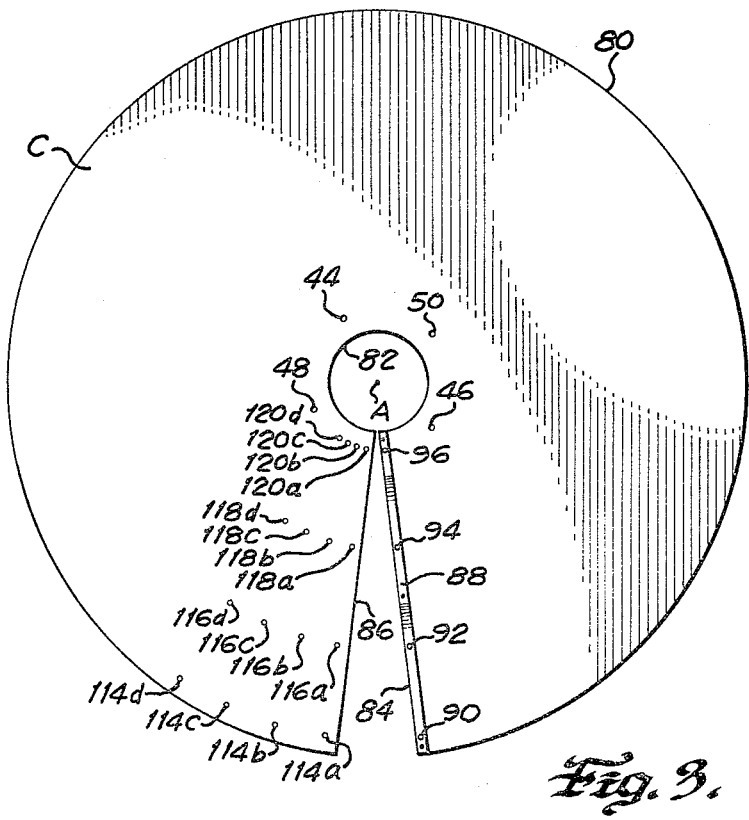
Fig. 3.

HALIDE AND LIKE LIGHT REFLECTOR AND SOCKET ASSEMBLY FOR GREENHOUSE AND LIKE USE

DESCRIPTION

TECHNICAL FIELD

The present invention relates generally to the art of lighting fixtures, and more particularly to reflector and socket assemblies for high powered lamps such as halide lights or the like wherein the reflector and its associated components are especially adapted to enhance use of the light for effectively illuminating and promoting the growth of plants in a greenhouse or the like.

BACKGROUND ART

High powered halide lights and the like are well known and widely used for overhead street and roadway lighting because of the high intensity of illumination they provide, and in such usage are conventionally used in light fixtures comprising either a globular transluscent surrounding envelope or a reflector in fixed form. Several varieties of fixed form reflectors for this type of lighting are commercially available and typically involve relatively heavy and rigid, pressed steel reflectors such as the Abolite reflector manufactured and marketed by Abolite Lighting Inc., West Lafayette, Ohio, the configuration of such reflectors being that of a generally cylindrical sleeve portion spaced from and surrounding, with ventilating holes, a screw type socket, below which there is a flared out, generally hemispherical portion, below which is a further downwardly and outwardly extending portion terminating in an almost cylindrical downwardly directed lip. Such a reflector, which is conventionally arranged on posts or the like for street or roadway lighting, tends to reflect the light downwardly in a relatively narrow flood angle, e.g. 20° or 30°, which is generally satisfactory for street lighting or the like because the reflectors are typically located 30 or 40 feet or more above the street or highway surface being illuminated.

A further usage for high powered halide and like type lights has evolved more or less recently, and that is for the illumination of growing plants in enclosed building spaces, such as in greenhouses or the like, where it has been found that such type of lighting is quite satisfactory for enhancing the growth rate of plants and other flora. However, in the greenhouse or like environment the most effective usage of such lighting is with the lights only a few feet, e.g. 4 to 6 feet, above the growing plants, and it has been found that, in such environment and arrangement, commercially available reflectors for halide and like lights are not suitable, or at least not nearly as effective as they should be, because the resulting flood beam is so narrow that the lighting throughout the greenhouse or the like is quite uneven and either too intense or insufficient on a localized basis. Moreover, commercially available reflectors for halide and like lights have been found to be unduly heavy and unduly expensive to fabricate for greenhouse or like lighting purposes in that they are principally designed for rough, outdoor usage whereas the greenhouse or like environment does not require comparable rugged construction.

DISCLOSURE OF THE INVENTION

It is an object and feature of the present invention to provide a reflector and socket assembly for high powered halide and like lights which is especially adapted for use in greenhouse or like applications of such lights, wherein such lights are situated over and relatively close to growing plants and wherein it is desired that the light be relatively uniformly distributed over a relatively wide area.

It is a further object and feature of the invention to provide a reflector and socket assembly for halide and like lights for greenhouse and like illumination purposes wherein the reflector can be economically and readily fabricated from nominally planar sheet stock.

Yet another feature and advantage of the present invention is to provide a reflector and socket assembly for halide and like lamps for greenhouse and like illumination purposes which is of relatively shallow, frusto-conical form which in its preferred configuration incorporates means for limited angular adjustment of the cone angle in relation to the socket/reflector/light concentric axis, which makes it possible for a user to select an optimal cone angle under any given set of greenhouse or like environmental conditions, giving due consideration to such factors as the distance of the light above the growing plants, the number and pattern of lights arranged above an area, and the particular power rating of the light with which the reflector is being used. As a related feature of this preferred form of the assembly of the present invention, counterbalancing means are provided in a portion of the reflector generally opposite the overlapping reflector segment enabling adjustability of the reflector, to counterbalance, on a variable basis, the weight of the overlapping reflector segment or sector so that the reflector and socket assembly will have a level attitude, i.e. with its lower edge substantially horizontal, for any given reflector cone angle selected.

These and other features, advantages and characteristics of the present invention will occur to those skilled in the art to which the invention is addressed, in the light of the following description and accompanying illustration of typical specific forms thereof.

BRIEF DESCRIPTION OF THE DRAWINGS

FIG. 1 is a perspective view from an upper aspect, with certain portions broken away for clarity of illustration, of the preferred form of reflector and socket assembly of the present invention.

FIG. 2 is a view in vertical cross section of the reflector and socket assembly shown in FIG. 1, taken substantially along line 2—2 thereof;

FIG. 3 is a plan view of the reflector portion of the assembly shown in FIGS. 1 and 2, showing the configuration thereof as cut from nominally planar sheet stock and showing the nature threof before interconnection of the radial edges;

FIG. 4 is a detail view in side elevation and on enlarged scale of the counterweight means of the assembly shown in FIGS. 1 and 2;

FIG. 5 is a top plan view of the counterweight means shown in FIG. 4;

FIG. 6 is a view in lateral cross section, taken substantially along line 6—6 of FIG. 5, of the counterweight means;

BEST MODE OF THE INVENTION

Figure 7:
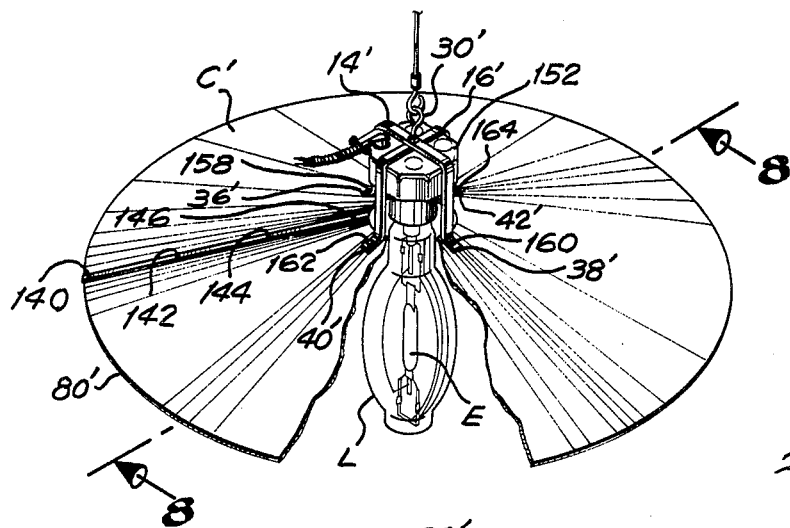
FIG. 7 is a perspective view from an upper aspect, similar to the view of FIG. 1, showing another form of reflector and socket assembly according to the present invention, wherein the reflector is fabricated in fixed form.

The halide light and reflector and socket assembly shown in FIGS. 1 and 2 in general comprises a reflector cone C, a socket assembly S and a halide light L. The light L is suitably a 1000 watt Sylvania Super halide metal arc lamp, conventional per se, threaded into socket 10, also conventional per se, of the socket assembly S, said socket 10 being suitably of the type marketed by Leviton, with a 1500 watt, 600 volt rating. In the embodiment shown, socket 10, including its electrical wiring 12, is mounted on one of U-shaped mounting straps 14, 16 preferably so as to be vertically adjustable with respect thereto, as by bolts 18, 20 and associated nuts 22, 24 and 26, 28 (FIG. 2). Centrally of and interconnecting the U-shaped mounting straps 14, 16 is an eye bolt 30, configured and arranged so that the socket and reflector assembly can be hung or otherwise supportably mounted in a depending manner from overhead structure, as by a suspension hook 32 and cable 34 (FIG. 1).

In the embodiment shown in FIGS. 1 and 2, the U-shaped straps 14, 16 of the socket assembly S are provided with apertured, outwardly formed depending ends 36, 38 and 40, 42, and the cone reflector C is correspondingly apertured as at respective holes 44, 46 and 48, 50 (FIG. 3), through which respective bolts 52, 54 and 56, 58, capped by respective wing nuts 60, 62 and 64, 66 pass to interconnect the cone reflector C and the socket assembly S coaxially, with respective compression springs 68, 70 and 72, 74 being arranged between the strap ends and the cone surface to permit and accommodate, without reflector distortion, the changes in angle therebetween upon change in angle of the cone reflector, as discussed more fully below.

Cone reflector C, during fabrication and in blank form as shown at FIG. 3, is advantageously fabricated from nominally planar sheet stock such as 0.045" gauge aluminum sheet, four feet in diameter, and surfaced on at least one (i.e. the lower) side, with a light colored, highly reflective surface, such as a white baked enamel coating. To fabricate the reflector, the sheet stock is cut, by means conventional per se, to desired outer diameter (e.g. forty-eight inches) and to a desired central aperture diameter (e.g. four inches) to form respective outer and inner edges 80, 82. Radial cuts are also made to provide radially extending edges 84, 86 which are brought together and overlapped to an extent to change the form of the material from essentially planar to frustoconical. A stiffening strip 88 of aluminum or like material is laid along radial edge 84 and riveted or otherwise attached thereto in a manner conventional per se, and a plurality of holes 90, 92, 94, 96 are drilled or otherwise formed through the strip 88 and cone adjacent the edge 84 to receive respective adjustment bolts 98, 100, 102, 104 and associated wing nuts 106, 108, 110, 112. Adjustment holes are arranged in radial pattern in the cone more or less near the other radially cut edge 86 thereof and are employed in association with the holes 90–96 and bolts 98–104 in the selection of any one of several cone angles of the cone reflector C. Specifically, in the embodiment shown in FIGS. 1–3, radially arranged adjustment holes 114a, 116a, 118a, 120a are located to provide, when aligned with the holes 90–96 and assembled with bolts 98–104, a reflector cone angle of substantially 76° with respect to the center axis A of the cone. The radial arranged pattern of holes 114b, 116b, 118b, 120b is arranged to provide, when selected, a reflector cone angle of 72°. The radial pattern of holes 114c, 116c, 118c, 120c is arranged, when selected, to provide a reflector cone angle of 68°, and the radial pattern of holes 114d, 116d, 118d, 120d is arranged, when selected, to provide a reflector cone angle of 64°.

The cone reflector C is shown in FIGS. 1 and 2 in its assembled form with a selected cone angle of 68° and with the light emitting element E of the halide lamp L being substantially in the plane of the lower outer edge 80 of the reflector cone C, which is considered to be the preferred orientation of the light and cone reflector in applications of this assembly where the light emitting element E is arranged about 4–6 feet above the tops of growing plants. As will be apparent, however, considerable variation in both cone reflector angle and the relative vertical position of the light L and its light emitting element E are available to the user in any given use environment, as well as variation, of course, in the suspension level in general, by means of variation in the length of suspension cable 34 or the like.

In that a usual manner of use of the reflector and socket assembly shown in FIGS. 1–3 is by simple suspension thereof from an axially disposed single cable 34 and hook 32 or the like, and in that the extent of overlap of the radial edges 84, 86 is varied with change or adjustment of the cone angle, the assembly also preferably includes counterbalance or counterweight means on the upper side of the cone reflector and positioned generally diametrically oppositely of the radially cut edges thereof, to substantially counterbalance the uneven weight of the overlapping segment of the reflector cone and thereby establish and maintain the outer edge of the cone substantially level when the assembly is hung in a suspended manner. In the assembly shown in FIGS. 1 and 2, and as shown in enlarged detail in FIGS. 4, 5 and 6, the counterweight means includes a generally cylindrical counterweight 120, formed of steel rod or the like, adjustably attached as by bolt 122 and wing nut 124 to a strap 126, provided with an elongate slot 128 along which the counterweight 120 is movable to any selected position by means of the loosening and tightening of the wing nut 124. Strap 126 is in turn pivotally mounted on bracket 130, which is in turn mounted as by rivets 132 to the cone reflector. As will be evident, the weight 120 is placeable in a wide range of spacings radially of and relative to the axis A of the assembly, by either movement of the weight 120 along the slot 128 of strap 126, or by shifting of the strap to or from its inwardly directed position shown in solid line in FIG. 1 and its outwardly directed position shown in broken line in FIG. 1, to vary the effect of the counterweight relative to the weight of the overlapping segment on the other side of the cone reflector.

Figure 8:
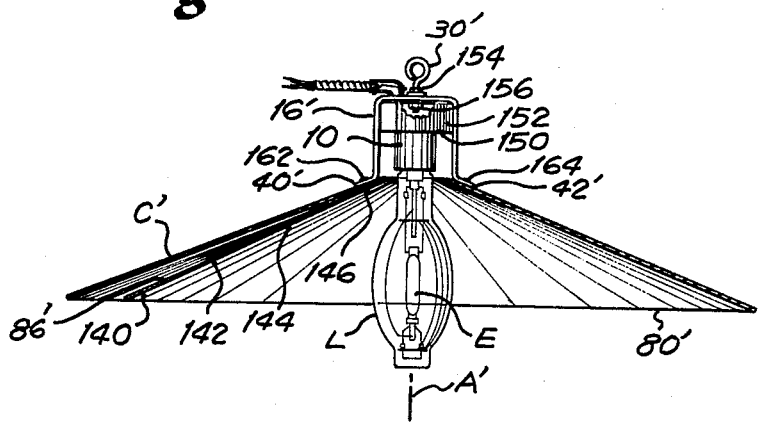
FIG. 8 is a view in vertical cross section of the reflector and socket assembly shown in FIG. 7, taken substantially along line 8—8 thereof.
Figure 9:
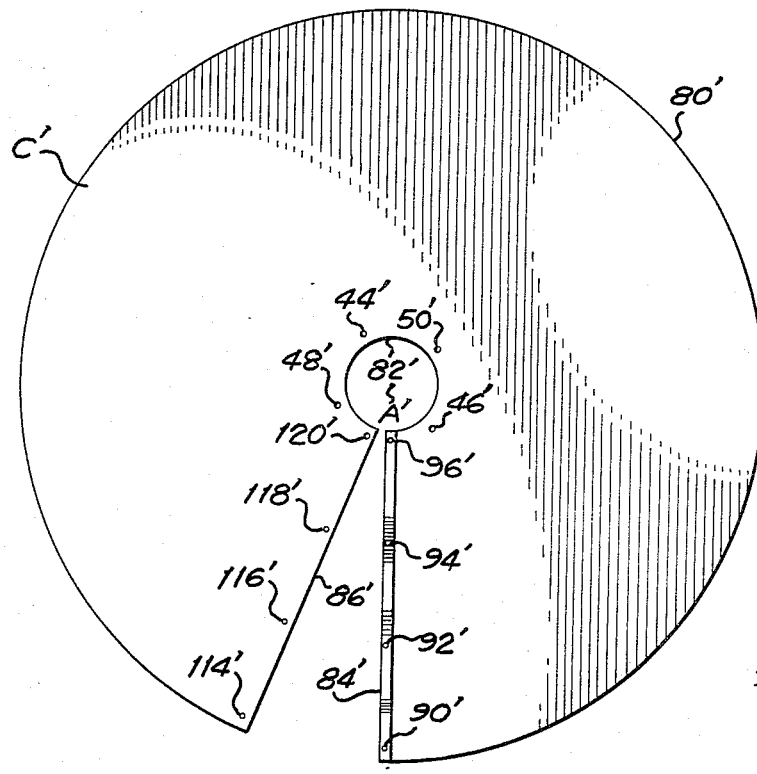
FIG. 9 is a plan view, substantially to the view of FIG. 3, showing the pattern of the reflector portion of the assembly shown in FIGS. 7 and 8, as cut from nominally planar sheet stock and before interconnection of the radial edges thereof to form the frustoconical reflector.

FIGS. 7, 8 and 9, in views corresponding to the respective views of FIGS. 1, 2 and 3, show another and simplified form of halide and like type light reflector and socket assembly according to the present invention, which in this instance is made rigid, i.e. nonadjustable, as to cone angle.

In this modified assembly, (and utilizing prime numerals to indicate like components or configurations), reflector cone C' is cut from nominally planar sheet stock of like type and in like manner as the reflector cone C of the earlier described form, with outer and inner circular edges 80', 82', and segmented along radial cuts to provide radially extending edges 84', 86'. However, in this instance, the radially extending edges 84', 86' are cut along radii to provide in the cone C' when assembled a cone angle of substantially 68° relative to the central axis A', and with single rows of assembly holes 90', 92', 94', 96' and 114, 116, 118, 120 adjacent respective radially extending edges 84', 86'. Also, assembly holes 44', 46', 48', 50' are drilled or otherwise formed adjacent the central opening edge 82' in like manner as the assembly holes 44-50 in the reflector cone C of the first discussed form of the invention.

Cone reflector C' is formed to the desired cone angle simply by drawing the radially extended edges thereof together with sufficient overlap to align the respective edge holes 90'-96' and 114', 120', with pop rivets being applied to assemble the edges together, as indicated at respective rivets 140, 142, 144, 146.

The socket assembly of the form of the invention shown in FIGS. 7 and 8 is suitably a fixed assembly comprising conventional lamp socket 10 mounted centrally of conventional cover 150 of conventional electrical outlet box 152, with quadrantly arranged U-shaped straps 14', 16' bolted together centrally and to the bottom of the outlet box 152 by means of eye-bolt 30' and associated upper and lower nuts 154, 156. Apertured, lower, outwardly bent respective ends 36', 38' and 40', 42' of the mounting straps 14', 16' are connected to the reflector cone C' by means of respective rivets 158, 160 and 162, 164 to assemble the socket 10 of outlet box 152 and the mounting straps 14', 16' concentrically with the reflector cone C', the arrangement being such that halide or like type lamp L and its light emitting element E, with the lamp L screwed into socket 10, is concentric with the central axis A' of the assembly and with the light emitting element E substantially in the plane of the lower edge 80' of the reflector cone C'.

As will be apparent, either of the respective socket asemblies shown in FIGS. 1, 2 and in FIGS. 7, 8 may be employed with either of the reflector cones C or C'. As will also be apparent, the specific dimensions involved as to the outer and inner edges of the reflector cone may be varied to an appreciable extent, it being considered in this regard, however, that the outer diameter of the cone should be at least about four feet for optimally effective reflection downwardly of the emitted light, and that the diameter of the central opening provided by inner edge 82 or 82' should be at least about four inches since the outer diameter of the socket 10 in the examples selected is about 2 ¼ inches and since adequate spacing should be provided around the socket for substantial air circulation upwardly from the hot surface of the lamp L.

From the foregoing, various further modifications and adaptations of the constructional arrangement and form of the assemblies shown and discussed will be apparent to those skilled in the art to which the invention is addressed. Thus, by way of further and nonlimitive example, other lightweight materials can be used in the fabrication of the reflector cone, and the counterweight means when employed can take other forms, such as simply a permanent magnet if the reflector cone material is magnetic or if a magnetic strip is laid radially along the upper surface of the reflector cone opposite the segmented portion thereof. Also, the adjustability provided by the several radially extending rows of slots 114a-d through 120a-d can be provided by arcuately extending slots extending continuously from 114a through 114d, from 116a through 116d, from 118a through 118d and from 120a through 120d, if desired, with the result that the cone angle is adjustable through the indicated range to any desired angle within the range.

I claim:

1. A reflector socket assembly for a high powered halide light or the like, especially adapted to enhance use thereof for effectively illuminating and promoting the growth of plants in a greenhouse or the like, said assembly comprising:
   a frustoconically shaped reflector in the form of a simple cone, with the lower, concavical, reflecting surface thereof adjustable through a range of cone angles from about 76° to about 64° with respect to the center axis of the cone, said cone being of substantially unitary construction and fabricated from a centrally apertured disk, of nominally planar sheet stock, with a single small segment cut therefrom along cuts extending generally radially from the central aperture to the exterior edge of the disk, the radially extending edges thereof being joined to provide the conical condition of the reflector, and the adjustability of the reflector cone angle with respect to the cone axis being provided by varying the extent of overlap of the respective radial edges; and
   a lamp socket mounted coaxially of and slightly above and in spaced relationship with respect to the central aperture of the cone, with the light emitting element of a halide lamp or the like installed in the socket being substantially in the plane of the lower, outer edge of the reflector cone.

2. An assembly according to claim 1, wherein the lamp socket is adjustable axially of the cone reflector.

3. An assembly according to claim 2, wherein the cone reflector has an outer diameter of about forty-eight inches and a central aperture diameter of about four inches.

4. The assembly of claim 1, further comprising a row of radially arranged holes along one radial edge of the cone and several rows of radially arranged holes along several radii of the cone adjacent the other radial edge thereof, together with removable fastening means insertable into the holes of the row of holes along the first radial edge and insertable into a selected row of holes adjacent the other radial edge, the said several rows of holes enabling variation of the reflector cone angle.

5. An assembly according to claim 1 or claim 4, further comprising counterweight means arranged on the upper side of the cone generally diametrically opposite of the radially cut edges thereof, and functioning to generally counterbalance the weight of the overlapping segment of the cone so that the reflector outer edge is substantially level when the assembly is hung in a suspended manner.

6. An assembly according to claim 5, wherein said counterweight means includes elements movable generally radially of the cone to vary the extent of counterweighting and compensate for any change in the extent of overlap of the cut edges of the cone.

7. The assembly according to claim 1 or claim 4, comprising socket mounting means including generally U-shaped straps to which said lamp socket is connected centrally, and means interconnecting the ends of said straps and the cone adjacent the edge of the central aperture therein.

8. An assembly according to claim 7, wherein said interconnection means comprises a flexible interconnection means, as by interposed compression springs enabling variation of the relative position of the cone inner edge and said strap ends with change in cone angle.

* * * * *